Oct. 23, 1956 C. I. BEARD ET AL 2,768,247

STABILIZED LOW FREQUENCY AMPLIFIER WITH DRIFT CORRECTION

Filed April 22, 1952

CHARLES I. BEARD
ROBERT L. MILLS
INVENTOR.

BY D. Carl Richards
AGENT

United States Patent Office 2,768,247

Patented Oct. 23, 1956

2,768,247

STABILIZED LOW FREQUENCY AMPLIFIER WITH DRIFT CORRECTION

Charles I. Beard, Adelphi, Md., and Robert L. Mills, Dallas, Tex., assignors, by mesne assignments, to Socony Mobil Oil Company, Inc., a corporation of New York Application April 22, 1952, Serial No. 283,782

1 Claim. (Cl. 179—171)

This invention relates to low frequency amplifying systems and more particularly to compensation for amplifier drift.

In many applications it is desirable to present voltage wave forms on a cathode ray oscilloscope or other viewing means for the study of dominant characteristics thereof in relation to time. The control of the position of a repeated low frequency transient on an oscilloscope screen is difficult particularly where the electrical signals require extremely high amplifications. If an amplifier having a substantial band width and high gain is required, the presentation of the signals on the oscilloscope is modified by unpreventable changes in the operating characteristics of amplifying tubes and other circuit components. The component variations which cause such drift probably occur in all electronic amplifiers, but in many applications simple filtering means may be adopted to eliminate drift. However, in low frequency amplifiers or D. C. amplifiers the drift is often greater than the signal during an interval of study and cannot be eliminated by simple filtering procedures.

At the outset, then, if the input to a wide band high gain low frequency amplifier is short circuited, voltage variations ordinarily appear at the output. In accordance with the present invention the amplifier output is caused to remain substantially constant. A system between the amplifier and an output point periodically adjusts the level of the voltage applied at the output point to a predetermined constant value regardless of variations in the amplifier output level. Adjustments are made as frequently as practical for maximum drift elimination and are made quickly enough that the adjustment period is negligible compared to the time required for variations in any desired signal superimposed on or combined with the amplifier drift.

More particularly, there is provided a system for compensating for amplifier voltage drift in the presence of a periodic signal component. The system includes a tube having the drift and signal components applied to the grid thereof and having a cathode and an anode with the anode connected to an output terminal. A normally open high gain feedback circuit is connected to the output terminal and to a storage element connected in the feedback circuit to receive a voltage opposite in polarity to the voltage at said grid. Circuit means are provided for applying the voltage across the storage element to the control grid, and means are further provided for closing the loop in each cycle of the periodic signal component for a short period during which the latter component is zero for cancellation at the grid of the drift component whereby when the feedback circuit is open only the signal component is transmitted through said tube to said output terminal.

Figure 1:
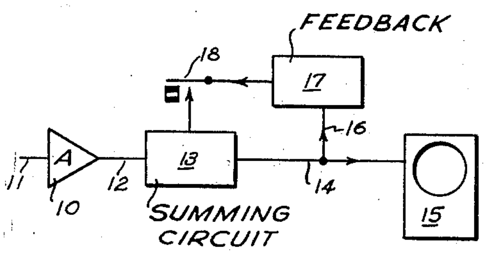
Figure 2:
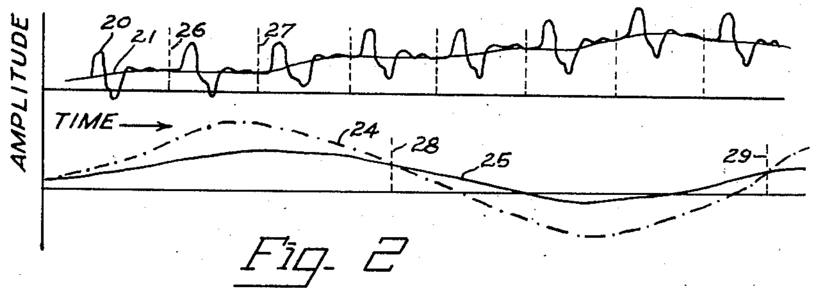

For a more complete understanding of the present invention reference may now be had to the following description taken in conjunction with the accompanying drawings in which:

Fig. 1 is a block diagram of one form of the present invention;

Fig. 2 includes two amplitude-time plots of signal and drift components; and

Figure 3:
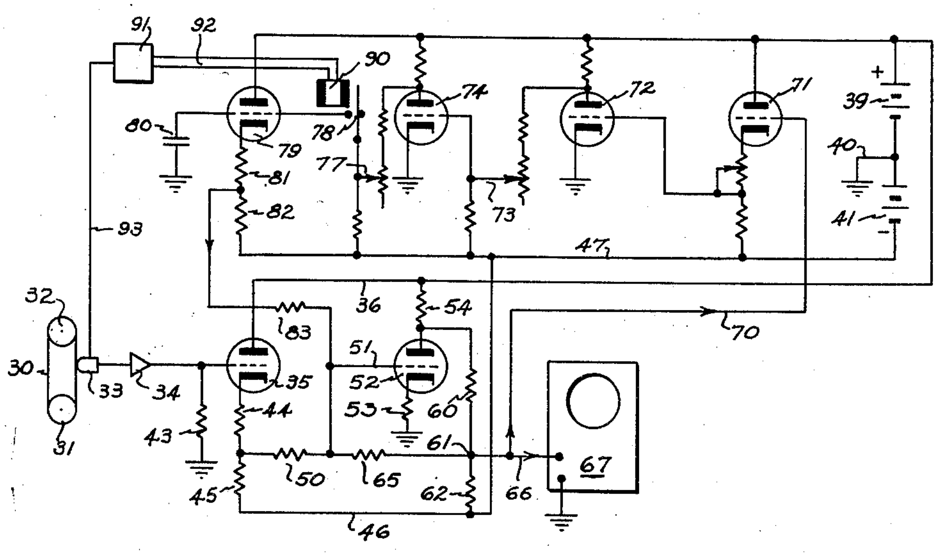

Fig. 3 is a circuit diagram of the drift compensating network.

Referring first to Fig. 1, element 10 represents a high gain low frequency wide band amplifier. Signals applied to the input 11 of amplifier 10 are then applied to the input 12 of a summing circuit 13. The output of the summing circuit 13 is applied by way of channel 14 to a measuring means generically illustrated by the cathode ray oscilloscope 15. The output of the summing circuit is also applied by way of channel 16 to a feedback network 17 which is normally open circuited. As illustrated, a relay operated switch 18 is connected between the feedback network 17 and the summing circuit 13.

Generally, in operation of the low frequency wide band amplifier 10 the output is a combination of a periodically recurring signal 20 illustrated in Fig. 2, having an amplitude and wave form to be measured or studied and a random unwanted drift component 21. For the purpose of illustration, the drift and the signal components are shown in substantially equal magnitude. In actual practice drift voltages in the order of fifty volts are not uncommon where signals to be measured are in the order of one volt. In instances where the periodically recurring signal component has a relatively high frequency compared to the drift component, the signal may be filtered and drift eliminated by means more or less conventional. When a signal component such as the component 24 is in the same frequency range as the drift component 25, filtering is no solution at all. When the drift has amplitudes very much greater than that of the signal, measurement becomes impossible.

In accordance with the present invention, means are provided for closing the feedback loop 17 by means of switch 18 in synchronism with and at times when the pediodically recurring signal is zero to introduce a cancellation voltage into the summing circuit 13. The switch 18 is closed at times 26, 27, etc., which with reference to the signal 20, are at zero potential point so that only the drift component will appear in the feedback loop, and the voltage introduced from the feedback loop into the summing circuit will be dependent only upon drift. Similarly with respect to the low frequency wave 24, closure of the feedback loop at times 28 and 29 limits the voltage in the feedback loop to the drift component.

The present invention is useful in elimination of drift in the presence of the high frequency wave 20 or from the lower frequency wave 24, where other means are not adequate. If the signal component is to be measured or is to be displayed on an oscilloscope 15, the provisions of the present invention assure the initiation of the sweep at the same point on the oscilloscope face for each cycle.

Referring now to Fig. 3, there is illustrated a circuit diagram which is one form of a system suitable for carrying out the present invention. For the purpose of this description, it will be assumed that a transient signal of extremely low frequency is recorded on a magnetic tape 30 and is repeatedly reproduced as it is driven over pulleys 31 and 32 past a transducer 33. The signal from transducer 33 is applied to a high gain low frequency wide band amplifier 34 whose output is comprised of signal and drift components.

The output of amplifier 34 is applied to the control grid of a cathode follower tube 35. The anode of tube 35 is connected by way of conductor 36 to the B+ terminal of a suitable B— supply source such as battery 39. The negative terminal of battery 39 is connected by conductor 40 to ground and also is connected to the positive terminal of a second battery 41.

The grid of tube 35 is connected by way of resistor 43 to ground, and the cathode is connected by way of resistors 44 and 45 and conductors 46 and 47 to the negative terminal of battery 41. The juncture between resistors 44 and 45 is connected by way of resistor 50 to the control grid 51 of a mixer tube 52 for application of the signal from amplifier 34. The cathode of mixer tube 52 is connected by way of resistor 53 to ground and its anode is connected by way of resistor 54 to the B+ conductor 36. The anode of tube 52 is also connected by way of resistor 60 to an output terminal 61 and thence by way of resistor 62 to the negative terminal of battery 41. By proper selection of resistors 54, 60 and 62, with due regard to the impedance of the mixer tube 52, the output terminal 61 will be maintained substantially at a zero D. C. level or at the potential of the ground point 40 when the input to tube 35 is zero.

The output terminal 61 is connected by way of resistor 65 to the control grid 51 forming a local feedback loop for the mixer tube 52. The output terminal 61 is also connected by way of conductor 66 to a measuring device such as a generically represented by the cathode ray oscilloscope 67.

Thus there is provided a low frequency mixer channel for application to the oscilloscope or measuring device 67 of signals applied to the input grid of tube 35. The gain of the mixing network is relatively low with little inherent drift. However in order to compensate for the drift component of the voltage from amplifier 34 as applied to the grid of tube 35, a second feedback loop is provided between the output terminal 61 and the input grid 51 of tube 52.

More particularly, the terminal 61 is connected by way of conductors 66 and 70 to the input of a cathode follower stage 71. The output of the cathode follower stage 71 is directly coupled to the grid of an amplifier 72 whose output in turn is connected through potentiometer 73 to the control grid of a second amplifier 74. The voltage at the anode of tube 74 corresponds with the voltage on the grid 51 in form but is inverted 180° as to be out-of-phase. The voltage from the anode of tube 74 is applied through potentiometer 77 to the armature of a normally open switch 78. The normally open terminal of switch 78 is connected directly to the grid of tube 79 and also to one terminal of a storage element or capacitor 80. The other terminal of capacitor 80 is connected directly to ground.

The output tube 79 is a cathode follower stage having its anode connected directly to the positive terminal of battery 39 and its cathode connected by way of resistors 81 and 82 and conductor 47 to the negative terminal of battery 41. The point intermediate resistors 81 and 82 is connected by way of resistor 83 to the grid 51 of tube 52.

Tubes 35 and 79 preferably have like characteristics, and resistors 50 and 83 preferably have the same magnitude so that if equal voltages are applied to tubes 35 and 79 the voltages from tube 35 and from tube 79 will be applied to the grid 51 in substantially equal magnitudes.

The mixer tube 52 and its associated circuit is designed so that the voltage appearing between output terminal 61 and ground is equal in magnitude and opposite in sense to the sum of the voltage appearing across resistor 50 and the voltage across the resistor 83. The voltage appearing across resistor 50 may be thought of as composed of a signal voltage component and a drift component. When switch 78 is momentarily closed, the signal voltage being zero, condenser 80 is charged to a voltage dependent only upon the drift component. The charge on condenser 80 remains substantially constant until switch 78 is again closed since there is no low impedance discharge path. The voltage on condenser 80 then is applied, through the cathode follower stage 79 to the grid 51, appearing across resistor 83. There are three phase inverting stages in the entire feedback loop, namely at tubes 52, 72 and 74. The voltage on condenser 80 therefore is opposite in polarity to the voltage across resistor 50. Thus in so far as the drift component is concerned the grid 51 is unaffected. This is true if the amplification in the feedback loop is very high for it is only when the amplification is high that the voltage across condenser 80 approaches or is nearly equal to the drift component appearing across resistor 50. In the latter case upon closure of the switch 78 when the signal voltage is zero, the feedback loop sees only the drift component and for the following interval subtracts at grid 51 the drift component from the voltage appearing across resistor 50.

Switch 78 may conveniently be closed by a relay coil 90 coupled to an actuating unit 91 by a circuit 92. The control circuit 91, in the form here illustrated, is actuated from transducer 33 by way of the channel 93. A control pulse recorded on loop 30 in predetermined time relation to the periodic signal, when channeled to the relay coil 90 in manner well known in the art, is suitable. It will be apparent that actuation of the relay 90 may be accomplished by mechanically synchronizing it with the cyclically driven recording element 30. More particularly, one suitable means for actuating the switch 78 would be to control the movable arm of the switch 78 by means of a cam driven from the shaft supporting one or the other of pulleys 31 or 32 and properly synchronized with playback of the signal recorded on loop 30. Alternatively, it may be accomplished by differentiation of the signal voltage with a suitable delay incorporated in circuit 92 for closure at the instants when the signal is zero.

Thus even though high drift voltages are present, when there is no signal applied from transducer 33 to the high gain amplifier 34, the oscilloscope trace remains substantially fixed. Absent the provisions herein described, drift in amplifier 34 would completely wipe the trace from the oscilloscope face. By periodically adjusting the voltage on condenser 80 to a value equal and opposite the value of the drift component at the instant of closure of the switch 78 the effect of drift is nullified. Superposition of successive cycles of the desired signal for satisfactory cathode ray presentation is made possible because vertical displacement of successive sweeps of the beam due to amplifier drift are minimized. Use of the drift compensation system gives assurance that the desired wave form will appear at a predetermined point on the screen for observation or photographic recording.

The invention has been found adaptable to and advantageous in electromagnetic investigation of earth structures where extremely low frequency signals are encountered and has particular merit not only in eliminating the drift due to the amplifier 34 but also the effect of telluric currents in the area of investigations. One such system is generically illustrated in the Patent 2,542,462 to C. I. Beard for Surface Wave Cancellation Electrical Prospecting. Without drift cancellation of the present invention, the maximum usable amplifier gain was in the order of 50,000. When the present invention was incorporated in such system, gains of the order of 500,000 were readily usable, the present invention providing stable operation at that level which substantially extended the range of the exploration technique.

While the invention has been described in a particular form, it will be apparent that modifications may be made within the scope of the invention. For example if the signal is of the type illustrated by the wave form 20 in Fig. 2, being characteristically high frequency, the switch 78 may be replaced by a filter which will maintain the charge on condenser 80 at all times substantially equal and opposite the drift component of the voltage across the resistor 50. However, the difficulty in constructing a low pass filter with a sharp cutoff is apparent so that for many low frequency applications the relay device is necessary. Other modifications, of course, now appear to those skilled in the art, and it is intended to cover such modifications as fall within the scope of the appended claim.

What is claimed is:

A system for controlling the drift component of the output of a low frequency amplifying system in the presence of a periodic signal component which comprises a first vacuum tube having an input grid, a cathode coupled to ground and an anode, a source of voltage connected at its mid-point to ground and coupled from its positive terminal to said anode, a voltage dividing network connected between said anode and the negative terminal of said battery which has an output terminal normally at ground potential, resistance means coupling said output terminal to said grid for maintaining the amplification of said vacuum tube substantially at unity, a first input circuit including a cathode follower stage, a resistance coupling said cathode follower stage to said grid, a second input circuit including an identical cathode follower stage, an identical resistance connecting said cathode follower stage to said grid, means for applying said output of said low frequency amplifying system to the first of said input circuits, a channel connected to said output terminal and having a phase inverting characteristic, circuit closing means connected between the output of said channel and said second input circuit, voltage maintaining means in said second input circuit for voltage application to said grid, and means for momentarily actuating said circuit closing means to energize said voltage maintaining means in proportion to the output of said channel at instants when said periodic signal component is zero thereby to maintain a voltage on said grid substantially equal and opposite said drift component so that said signal component only appears at said output terminal.

References Cited in the file of this patent

UNITED STATES PATENTS

| | | |
|---|---|---|
| 2,347,015 | Woloschak | Apr. 18, 1944 |
| 2,356,567 | Cockrell | Aug. 22, 1944 |
| 2,475,576 | Wild et al. | July 5, 1949 |
| 2,619,552 | Kerns | Nov. 25, 1952 |
| 2,709,205 | Colls | May 24, 1955 |

FOREIGN PATENTS

| | | |
|---|---|---|
| 620,140 | Great Britain | Mar. 21, 1949 |